US012741215B2

(12) United States Patent
Han et al.

(10) Patent No.: US 12,741,215 B2
(45) Date of Patent: Sep. 22, 2026

(54) CHARACTER INTERACTION CONTROL METHOD AND APPARATUS, AND COMPUTER DEVICE AND STORAGE MEDIUM

(71) Applicant: BEIJING ZITIAO NETWORK TECHNOLOGY CO., LTD., Beijing (CN)

(72) Inventors: Pengcheng Han, Beijing (CN); Zhaozhe Dong, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 587 days.

(21) Appl. No.: 18/271,376

(22) PCT Filed: Dec. 16, 2021

(86) PCT No.: PCT/CN2021/138735
§ 371 (c)(1),
(2) Date: Jul. 7, 2023

(87) PCT Pub. No.: WO2022/156442
PCT Pub. Date: Jul. 28, 2022

(65) Prior Publication Data

US 2024/0082723 A1 Mar. 14, 2024

(30) Foreign Application Priority Data

Jan. 22, 2021 (CN) ......................... 202110084922.5

(51) Int. Cl.
*A63F 13/56* (2014.01)
*A63F 13/58* (2014.01)
(Continued)

(52) U.S. Cl.
CPC .............. *A63F 13/56* (2014.09); *A63F 13/58* (2014.09); *A63F 13/798* (2014.09); *G06T 19/20* (2013.01); *G06T 2219/2004* (2013.01)

(58) Field of Classification Search
None
See application file for complete search history.

(56) References Cited

U.S. PATENT DOCUMENTS

2004/0029626 A1 2/2004 Annunziata
2004/0038739 A1 2/2004 Wanat
(Continued)

FOREIGN PATENT DOCUMENTS

CN 106621334 A 5/2017
CN 107019912 A 8/2017
(Continued)

OTHER PUBLICATIONS

Espacenet, JP 2003144749 A, 2025, https://translationportal.epo.org/emtp/translate/?ACTION=description-retrieval&COUNTRY=JP&ENGINE=google&FORMAT=docdb&KIND=A&LOCALE=en_EP&NUMBER=2003144749&OPS=ops.epo.org/3.2&SRCLANG=ja&TRGLANG=en , pp. 1-38 (Year: 2025).*
(Continued)

*Primary Examiner* — Tramar Harper
(74) *Attorney, Agent, or Firm* — BakerHostetler

(57) ABSTRACT

Provided are a character interaction control method and apparatus, and a computer device and a storage medium. The method comprises: in response to an attack trigger event of a plurality of first virtual characters to a second virtual character, performing set division on the plurality of first virtual characters, so as to obtain a plurality of character sets, wherein each character set comprises at least two first virtual characters; for each character set in the plurality of character sets, determining a target first virtual character, that meets an
(Continued)

Perform set partitioning on a plurality of first virtual characters in response to an attack trigger event of the plurality of first virtual characters against a second virtual character, to obtain a plurality of character sets — S110

↓

Determine, for each of the plurality of character sets, a first target virtual character in the character set that satisfies a condition for initiating an interactive action in a target interaction cycle — S120

↓

Control the determined first target virtual character to attack the second virtual character — S130 interaction action initiating condition, in the character set within a target interaction period; and controlling the determined target first virtual character to attack the second virtual character. The disclosure facilitates the user in performing effective determination on a scene and provides a good operating environment.

19 Claims, 3 Drawing Sheets

(51) Int. Cl.
*A63F 13/798* (2014.01)
*G06T 19/20* (2011.01)

(56) References Cited

U.S. PATENT DOCUMENTS

2004/0259634 A1* 12/2004 Machida ................. A63F 13/67 463/29
2007/0054716 A1* 3/2007 Hiruta ..................... A63F 13/56 463/1
2013/0053151 A1 2/2013 Sohn et al.
2014/0235334 A1* 8/2014 Tarumi .................. A63F 13/837 463/31
2020/0282312 A1 9/2020 Hu et al.
2023/0173386 A1* 6/2023 Matsushita ............. A63F 13/45 463/31
2023/0302361 A1* 9/2023 Cai ......................... A63F 13/35

FOREIGN PATENT DOCUMENTS

CN 109814955 A 5/2019
CN 110496394 A 11/2019
CN 111032171 A * 4/2020 ............. A63F 13/87
CN 111632379 A 9/2020
CN 111744195 A 10/2020
CN 111773656 A 10/2020
CN 111773696 A 10/2020
CN 112121441 A 12/2020
CN 112774200 A 5/2021
CN 113577781 A * 11/2021 ........... A63F 13/847
JP H11197364 A * 7/1999
JP H11-313978 A 11/1999
JP 2000126448 A * 5/2000
JP 2000279643 A * 10/2000
JP 2003117229 A * 4/2003
JP 2003144749 A * 5/2003
JP 2005074199 A * 3/2005
JP 2006-059381 A 3/2006
JP 2006-115972 A 5/2006
JP 2009-066350 A 4/2009
JP 2010-124874 A 6/2010
JP 2010-264066 A 11/2010
JP 2015150139 A * 8/2015
JP 7609356 B2 1/2025
KR 100458760 B1 * 12/2004 ............. A63F 13/10
WO WO 2007/032122 A1 3/2007

OTHER PUBLICATIONS

European Patent Application No. 21920816.2; Extended Search Report; dated May 6, 2024; 12 pages.
Paradox Interactive: "Navy—Hearts of Iron 4 Wiki"; https://hoi4.paradoxwikis.com/index.php?litle=Navy&oldid=38110; May 2020; accessed Apr. 22, 2024; 7 pages.
Written Opinion for International Application No. PCT/CN2021/138735, mailed Mar. 15, 2022, 08 Pages.
International Patent Application No. PCT/CN2021/138735; Int'l Search Report; dated Mar. 15, 2022; 3 pages.

* cited by examiner

CHARACTER INTERACTION CONTROL METHOD AND APPARATUS, AND COMPUTER DEVICE AND STORAGE MEDIUM

CROSS REFERENCE

The present application is the U.S. National Stage of International Application No. PCT/CN2021/138735, titled "CHARACTER INTERACTION CONTROL METHOD AND APPARATUS, AND COMPUTER DEVICE AND STORAGE MEDIUM", filed on Dec. 16, 2021, which claims the priority of the Chinese patent application No. 202110084922.5, filed on Jan. 22, 2021 and entitled "CHARACTER INTERACTION CONTROL METHOD AND APPARATUS, AND COMPUTER DEVICE AND STORAGE MEDIUM", the entire contents of both of which are incorporated herein by reference.

TECHNICAL FIELD

The present disclosure relates to the field of computer technology, in particular to a character interaction control method and apparatus, a computer device, and a storage medium.

BACKGROUND

In usage scenarios of some interactive applications, devices are required to control display of interface content. Especially for applications in which virtual characters are added to enrich interactive content, such as game applications, some virtual characters of a system are usually set to interact with a virtual character controlled by a player to improve interactivity and playability of the game applications, such as massive multiplayer online (MMO). In the game applications, the virtual characters of the system are controlled by a server, and the server mostly sets fixed attribute information for the virtual characters of the system to implement actions of the virtual characters and interact with the virtual character controlled by the player.

In a game process, a plurality of virtual characters (NPCs, monsters, and the like) often attack a virtual character (for example, a character controlled by a user) at the same time, for example, a character controlled by a player triggers hatred of a plurality of monsters and is attacked by the monsters. When excessive virtual characters launch attacks, chaotic and complex screen content may be caused. As a result, look and feel of game content are affected, more player's energy is consumed to cope with complex scenes, and user's operation determination and operability are easily affected.

SUMMARY

The embodiment of the disclosure provides at least a character interaction control method and apparatus, a computer device, and a storage medium.

In a first aspect, the embodiment of the disclosure provides a character interaction control method, wherein the method comprises:

performing set partitioning on a plurality of first virtual characters in response to an attack trigger event of the plurality of first virtual characters against a second virtual character, to obtain a plurality of character sets, wherein the character set comprises at least two first virtual characters;

determining, for each of the plurality of character sets, a first target virtual character in the character set that satisfies a condition for initiating an interactive action in a target interaction cycle; and controlling the determined first target virtual character to attack the second virtual character.

In a possible implementation, the performing set partitioning on a plurality of first virtual characters to obtain a plurality of character sets comprises:

determining attribute information of each first virtual character among the plurality of first virtual characters; and performing set partitioning on the plurality of first virtual characters according to the attribute information of each first virtual character to obtain the plurality of character sets, wherein the attribute information comprises at least one of a character type, an attack frequency, an attack distance type, an attack effect, and a movement speed.

In a possible implementation, the determining, for each of the plurality of character sets, a first target virtual character in the character set that satisfies a condition for initiating an interactive action in a target interaction cycle comprises:

determining, for each of the plurality of character sets, a comprehensive weight that each first virtual character in the character set can take action in the target interaction cycle; and determining, according to the comprehensive weight of each first virtual character, the first target virtual character in the character set that satisfies the condition for initiating an interactive action in the target interaction cycle.

In a possible implementation, the determining a comprehensive weight that each first virtual character in the character set can take action in the target interaction cycle comprises:

using the target interaction cycle as a current interaction cycle, and obtaining a comprehensive weight of each first virtual character in the character set at the end of the previous interaction cycle of the current interaction cycle, and a weight gain of each first virtual character;

determining a comprehensive weight of each first virtual character in the current interaction cycle based on the comprehensive weight of each first virtual character and the weight gain of each first virtual character; and determining the comprehensive weight of each first virtual character in the current interaction cycle as the comprehensive weight of each first virtual character in the target interaction cycle.

In a possible implementation, the determining a comprehensive weight that each first virtual character in the character set can take action in the target interaction cycle comprises:

when the target interaction cycle is a first interaction cycle, configuring an initial weight for each first virtual character according to the attribute information of each first virtual character in the character set; and using the initial weight of each first virtual character as the comprehensive weight of each first virtual character in the target interaction cycle, wherein the attribute information comprises at least one of a character type, an attack frequency, an attack distance type, an attack effect, and a movement speed.

In a possible implementation, after determining the first target virtual character in the character set that satisfies the condition for initiating an interactive action in the target interaction cycle, the method further comprises:

after at least one first virtual character attacks the second virtual character, resetting the comprehensive weight of each first virtual character in the at least one first virtual character to a preset weight, wherein the preset weight comprises an initial weight and a preset fixed weight; and using the preset weight of each first virtual character in the at least one first virtual character as the comprehensive weight of each first virtual character in the at least one first virtual character at the end of the target interaction cycle.

In a possible implementation, the determining, according to the comprehensive weight of each first virtual character, the first target virtual character in the character set that satisfies the condition for initiating an interactive action in the target interaction cycle comprises:

sorting the first virtual characters in the character set in descending order of comprehensive weights; and determining a preset quantity of first top-ranking virtual characters in the character set as first target virtual characters that satisfy the condition for initiating an interactive action.

In a possible implementation, the determining, according to the comprehensive weight of each first virtual character, the first target virtual character in the character set that satisfies the condition for initiating an interactive action in the target interaction cycle comprises:

determining the first virtual character in the character set, the comprehensive weight of which exceeds a preset weight threshold; and determining the corresponding first virtual character, the comprehensive weight of which exceeds the preset weight threshold, as the first target virtual character that satisfies the condition for initiating an interactive action.

In a possible implementation, the controlling the determined first target virtual character to attack the second virtual character comprises:

configuring a combat identifier for each determined first target virtual character;

controlling the first target virtual character configured with the participation identifier to attack the second virtual character.

In a possible implementation, after controlling the determined first target virtual character to attack the second virtual character, the method further comprises:

when it is determined that any first target virtual character configured with a combat identifier satisfies a combat identifier withdrawal condition, withdrawing the combat identifier of the first target virtual character that satisfies the combat identifier withdrawal condition.

In a possible implementation, the first target virtual character configured with the combat identifier satisfies the combat identifier withdrawal condition is determined in the following manner:

for each first target virtual character configured with a combat identifier, when the first target virtual character has died, determining that the dead first target virtual character satisfies the combat identifier withdrawal condition;

for each first target virtual character configured with a combat identifier, when the first target virtual character is struck to fly or fall, determining that the first target virtual character struck to fly or fall satisfies the combat identifier withdrawal condition; or for each first target virtual character configured with a combat identifier, determining at the end of an attack task of the first target virtual character that the first target virtual character who has completed the attack task satisfies the combat identifier withdrawal condition.

In a second aspect, the embodiment of the disclosure provides a character interaction control apparatus, wherein the apparatus comprises:

a set partitioning module, configured to perform set partitioning on a plurality of first virtual characters in response to an attack trigger event of the plurality of first virtual characters against a second virtual character, to obtain a plurality of character sets, wherein the character set comprises at least two first virtual characters;

a target determination module, configured to determine, for each of the plurality of character sets, a first target virtual character in the character set that satisfies a condition for initiating an interactive action in a target interaction cycle; and an attack execution module, configured to control the determined first target virtual character to attack the second virtual character.

In a possible implementation, the set partitioning module is, when configured to perform set partitioning on a plurality of first virtual characters to obtain a plurality of character sets, specifically configured to:

determine attribute information of each first virtual character among the plurality of first virtual characters; and perform set partitioning on the plurality of first virtual characters according to the attribute information of each first virtual character to obtain the plurality of character sets, where the attribute information includes at least one of a character type, an attack frequency, an attack distance type, an attack effect, and a movement speed.

In a possible implementation, the target determination module is, when configured to determine, for each of the plurality of character sets, a first target virtual character in the character set that satisfies a condition for initiating an interactive action in a target interaction cycle, specifically configured to:

determine, for each of the plurality of character sets, a comprehensive weight that each first virtual character in the character set can take action in the target interaction cycle;

determine, according to the comprehensive weight of each first virtual character, the first target virtual character in the character set that satisfies the condition for initiating an interactive action in the target interaction cycle.

In a possible implementation, the target determination module is, when configured to determine a comprehensive weight that each first virtual character in the character set can take action in the target interaction cycle, specifically configured to:

use the target interaction cycle as a current interaction cycle, and obtain a comprehensive weight of each first virtual character in the character set at the end of the previous interaction cycle of the current interaction cycle, and a weight gain of each first virtual character;

determine a comprehensive weight of each first virtual character in the current interaction cycle based on the comprehensive weight of each first virtual character and the weight gain of each first virtual character; and determine the comprehensive weight of each first virtual character in the current interaction cycle as the comprehensive weight of each first virtual character in the target interaction cycle.

In a possible implementation, the target determination module is, when configured to determine a comprehensive weight that each first virtual character in the character set can take action in the target interaction cycle, specifically configured to:

when the target interaction cycle is a first interaction cycle, configure an initial weight for each first virtual character according to the attribute information of each first virtual character in the character set; and use the initial weight of each first virtual character as the comprehensive weight of each first virtual character in the target interaction cycle;

where the attribute information includes at least one of a character type, an attack frequency, an attack distance type, an attack effect, and a movement speed.

In a possible implementation, the target determination module is further configured to:

after at least one first virtual character attacks the second virtual character, reset the comprehensive weight of each first virtual character in the at least one first virtual character to a preset weight, where the preset weight includes an initial weight and a preset fixed weight; and use the preset weight of each first virtual character in the at least one first virtual character as the comprehensive weight of each first virtual character in the at least one first virtual character at the end of the target interaction cycle.

In a possible implementation, the target determination module is, when configured to determine, according to the comprehensive weight of each first virtual character, the first target virtual character in the character set that satisfies the condition for initiating an interactive action in the target interaction cycle, specifically configured to:

sort the first virtual characters in the character set in descending order of comprehensive weights; and determine a preset quantity of first top-ranking virtual characters in the character set as first target virtual characters that satisfy the condition for initiating an interactive action.

In a possible implementation, the target determination module is, when configured to determine, according to the comprehensive weight of each first virtual character, the first target virtual character in the character set that satisfies the condition for initiating an interactive action in the target interaction cycle, specifically configured to:

determine the first virtual character in the character set, the comprehensive weight of which exceeds a preset weight threshold; and determine the corresponding first virtual character, the comprehensive weight of which exceeds the preset weight threshold, as the first target virtual character that satisfies the condition for initiating an interactive action.

In a possible implementation, the attack execution module is, when configured to control the determined first target virtual character to attack the second virtual character, specifically configured to:

configure a combat identifier for each determined first target virtual character; and control the first target virtual character configured with the combat identifier to attack the second virtual character.

In a possible implementation, the character interaction control apparatus further includes an identifier withdrawal module, the identifier withdrawal module is configured to, when it is determined that any first target virtual character configured with a combat identifier satisfies a combat identifier withdrawal condition, withdraw the combat identifier of the first target virtual character that satisfies the combat identifier withdrawal condition.

In a possible implementation, the identifier withdrawal module determines in the following manner that the first target virtual character configured with the combat identifier satisfies the combat identifier withdrawal condition:

for each first target virtual character configured with a combat identifier, when the first target virtual character has died, determine that the dead first target virtual character satisfies the combat identifier withdrawal condition;

for each first target virtual character configured with a combat identifier, when the first target virtual character is struck to fly or fall, determine that the first target virtual character struck to fly or fall satisfies the combat identifier withdrawal condition; or for each first target virtual character configured with a combat identifier, determine at the end of an attack task of the first target virtual character that the first target virtual character who has completed the attack task satisfies the combat identifier withdrawal condition.

In a third aspect, the embodiment of the disclosure provides a computer device, comprising a processor, a memory, and a bus, the memory storing machine-readable instructions executable by the processor, the processor communicating with the memory through the bus when the computer device runs, and the steps of the first aspect above, or any of the possible character interaction control methods of the first aspect being executed when the machine-readable instructions are run by the processor.

In a forth aspect, the embodiment of the disclosure provides a computer-readable storage medium, wherein the computer-readable storage medium stores a computer program, and the steps of the first aspect above, or any of the possible character interaction control method of the first aspect are executed when the computer program is run by a processor.

According to a character interaction control method and apparatus, a computer device, and a storage medium provided in the embodiments of the present disclosure, set partitioning is performed on a plurality of first virtual characters in response to an attack trigger event of the plurality of first virtual characters against a second virtual character, to obtain a plurality of character sets, where the character set includes at least two first virtual characters; for each of the plurality of character sets, a first target virtual character in the character set that satisfies a condition for initiating an interactive action in a target interaction cycle is determined; and the determined first target virtual character is controlled to attack the second virtual character.

In this case, attack permissions of the first virtual characters in each character set against the second virtual character are managed on a character set basis, and a first virtual character capable of attacking in the target interaction cycle is determined in each character set through the preset interaction condition, so that the plurality of first virtual characters can attack the second virtual character orderly, a quantity of the first virtual characters attacking the second virtual character at the same time is effectively limited, screen content is concise and orderly, look and feel of game content can be effectively improved, user's energy consumption for the game content can be effectively reduced, a user can effectively determine a scene, and a good operating environment can be provided.

In order to make the above-mentioned objects, features and advantages of the present disclosure more obvious and understandable, the following is a detailed description of the preferred embodiment, together with the accompanying drawings, as follows.

BRIEF DESCRIPTION OF THE DRAWINGS

In order to more clearly illustrate the technical solutions of the embodiments of the present disclosure, a brief description of the accompanying drawings, which are incorporated herein and form part of the specification, and which illustrate embodiments consistent with the present disclosure and are used in conjunction with the specification to illustrate the technical solutions of the present disclosure, is set forth below. It should be understood that the following figures illustrate only certain embodiments of the present disclosure and therefore should not be considered as limiting the scope, and that other relevant figures may be obtained from these figures without creative effort by one of ordinary skill in the art.

DETAILED DESCRIPTION OF PREFERRED EMBODIMENTS

Figure 1:
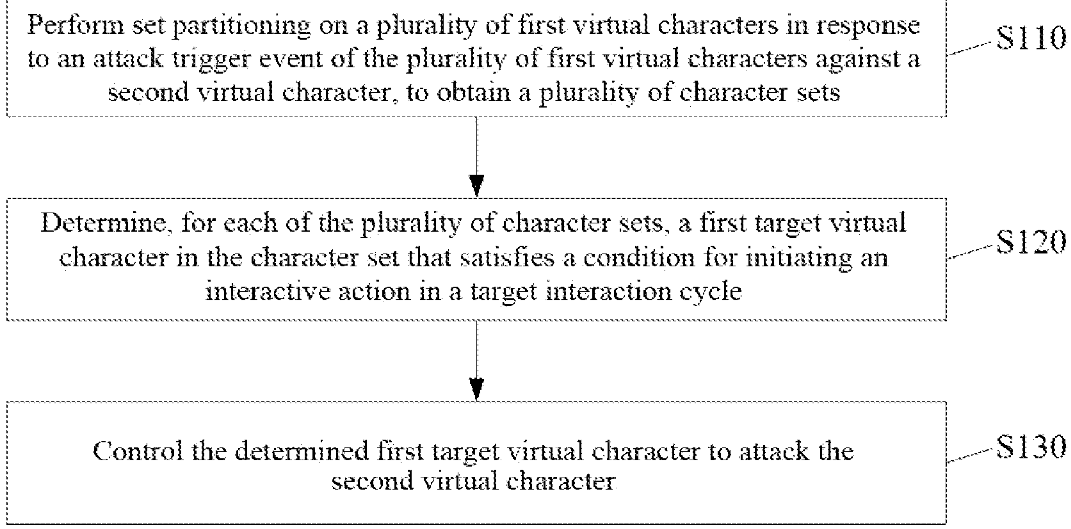
FIG. 1 is a flowchart of a character interaction control method provided in an embodiment of the present disclosure.

To make the purpose, technical solutions and advantages of embodiments of the present disclosure clearer, a clear and complete description of the technical solutions in embodiments of the present disclosure is set forth below in connection with the accompanying drawings in embodiments of the present disclosure, and it is clear that the embodiments described are only a portion of the embodiments of the present disclosure and not all of them. The components of the embodiments of the present disclosure generally described and illustrated in the accompanying drawings herein may be arranged and designed in a variety of different configurations. Accordingly, the following detailed description of embodiments of the present disclosure provided in the accompanying drawings is not intended to limit the scope of the present disclosure for which protection is claimed, but rather represents only selected embodiments of the present disclosure. Based on embodiments of the present disclosure, all other embodiments obtained by those skilled in the art without creative labor fall within the scope of protection of the present disclosure.

It should be noted that similar symbols and letters denote similar items in the accompanying drawings below, so that once an item is defined in one accompanying drawing, it need not be further defined and explained in subsequent drawings.

The term "and/or" in this document simply describes an associative relationship, indicating that three relationships can exist, for example, A and/or B, which can mean: A alone, both A and B, and B alone. Alternatively, the term "at least one" herein indicates any one of multiple or any combination of at least two of multiple, e.g., including at least one of A, B, C, and may indicate including any one or more elements selected from the set consisting of A, B, and C.

Studies found that in usage scenarios of some interactive applications, devices are required to control display of interface content. Especially for applications that add virtual characters to enrich interactive content, such as game applications, some virtual characters of a system are usually set to interact with virtual characters controlled by players to improve interactivity and playability of the game applications, such as massive multiplayer online (MMO). In the game applications, the virtual characters of the system are controlled by a server, and the server mostly sets fixed attribute information for the virtual characters of the system to implement actions of the virtual characters and interact with the virtual characters controlled by the players. In a game process, a plurality of virtual characters (NPCs, monsters, and the like) often attack a virtual character (for example, a character controlled by a user) at the same time, for example, a character controlled by a player triggers hatred of a plurality of monsters and is attacked by the monsters. When excessive virtual characters launch attacks, chaotic and complex picture content may be caused. As a result, impressions of game content are affected, more player's energy is consumed to cope with complex scenes, and user's operation determination and operability are easily affected.

Based on the foregoing studies, the present disclosure provides a character interaction control method, including: performing set partitioning on a plurality of first virtual characters in response to an attack trigger event of the plurality of first virtual characters against a second virtual character, to obtain a plurality of character sets, where the character set includes at least two first virtual characters; determining, for each of the plurality of character sets, a first target virtual character in the character set that satisfies a condition for initiating an interactive action in a target interaction cycle; and controlling the determined first target virtual character to attack the second virtual character.

In this case, attack permissions of the first virtual characters in each character set against the second virtual character are managed on a character set basis, and a first virtual character capable of attacking in the target interaction cycle is determined in each character set through the preset interaction condition, so that the plurality of first virtual characters can attack the second virtual character orderly, a quantity of the first virtual characters attacking the second virtual character at the same time is effectively limited, screen content is concise and orderly, look and feel of game content can be effectively improved, user's energy consumption for the game content can be effectively reduced, a user can effectively determine a scene, and a good operating environment can be provided.

The shortcomings of the above solution are all the results of the inventor's practice and careful study. Therefore, the discovery process of the foregoing problems and the solutions provided by the present disclosure below for the problems should all be the contributions made by the inventor to the present disclosure process.

For easy understanding of this embodiment, a character interaction control method disclosed in the embodiment of the present disclosure is first described in detail. An executive subject of the character interaction control method provided in the embodiment of the present disclosure is generally a computer device having computing power. The computer device includes, for example, a terminal device, a server, or other processing devices. The terminal device may be user equipment (UE), a mobile device, a user terminal device, a terminal device, a cellular phone, a cordless telephone, a personal digital assistant (PDA), a hand-held device, a computing device, an on-board device, a wearable device, or the like. In some possible implementations, the character interaction control method may be implemented by a processor calling computer-readable instructions stored in a memory.

The character interaction control method provided in the embodiment of the present disclosure will be described below with a terminal device as the executive subject.

Refer to FIG. 1, which is a flowchart of a character interaction control method provided in an embodiment of the present disclosure. The method includes steps S110-S130.

S110: Perform set partitioning on a plurality of first virtual characters in response to an attack trigger event of the plurality of first virtual characters against a second virtual character, to obtain a plurality of character sets.

A game scene of the embodiment of the present disclosure includes a plurality of virtual characters, the plurality of virtual characters include a virtual player character controlled by a game player and other characters besides the virtual player character, and the other characters may include non-player characters (NPCs), monsters, and the like. Here, the virtual player character may be used as the second virtual character, and at least one other character (such as NPCs and/or monsters) besides the virtual player character may be used as the first virtual character.

After detecting the attack trigger event, the terminal device may perform set partitioning on the plurality of first virtual characters to obtain the plurality of character sets. It should be noted here that each character set may include at least two first virtual characters. After the plurality of character sets are obtained, the plurality of first virtual characters may attack the second virtual character on a character set basis in subsequent steps.

In the embodiment of the present disclosure, the plurality of first virtual characters may be partitioned into sets in multiple set partitioning manners. For example, a random partitioning manner may be used to perform random set partitioning on the plurality of first virtual characters; or the game player may perform a set partitioning operation on the plurality of first virtual characters based on a demand or preference of the game player and based on the terminal device, and the terminal device performs set partitioning on the plurality of first virtual characters in response to the set partitioning operation of the game player; or the terminal device may perform set partitioning on the plurality of first virtual characters according to attribute information of each first virtual character.

In the embodiment of the present disclosure, the attribute information of the first virtual character may include at least one of a character type, an attack frequency, an attack distance type, an attack effect, and a movement speed. The terminal device may determine the attribute information of each first virtual character among the plurality of first virtual characters, and perform set partitioning on the plurality of first virtual characters according to the attribute information of each first virtual character to obtain the plurality of character sets. That is, the terminal device may perform set partitioning based on at least one of the character type, the attack frequency, the attack distance type, the attack effect, and the movement speed.

The character type is used as an example of the attribute information below to describe some manners of set partitioning based on the character type, where the character type may include at least a BOSS type, an elite type, and an ordinary type.

Optionally, the first virtual characters of the same character type may be partitioned into a set, that is, the character types of the first virtual characters in each character set are the same. For example, the first virtual characters of the BOSS type among the plurality of first virtual characters are partitioned into a character set, the first virtual characters of the elite type among the plurality of first virtual characters are partitioned into a character set, and the first virtual characters of the ordinary type among the plurality of first virtual characters are partitioned into a character set.

Optionally, in order to ensure balance of each character set to a great extent, each character set may include first virtual characters of at least two character types. For example, set partitioning is performed on the plurality of first virtual characters based on a proportion of the first virtual characters of each character type expected in each character set. It is assumed that each character set includes one first virtual character of the BOSS type, at least one first virtual character of the elite type, and at least two first virtual characters of the ordinary type. Set partitioning may be performed on the plurality of first virtual characters according to the foregoing specified conditions of the character types that the first virtual characters in the character sets need to satisfy.

The attack distance type is used as an example of the attribute information below to describe some manners of set partitioning based on the attack distance type, where the attack distance type may include at least remote attack and close attack.

Optionally, the first virtual characters of the same attack distance type may be partitioned into a character set, that is, the attack distance types of the first virtual characters in each character set are the same. For example, the first virtual characters of the remote attack among the plurality of first virtual characters are partitioned into a character set, and the first virtual characters of the close attack among the plurality of first virtual characters are partitioned into a character set.

The character type and the attack distance type are used as an example of the attribute information below to describe some manners of set partitioning based on the character type and the attack distance type.

Optionally, each character set may include the first virtual characters of at least two character types, and the attack distance types of the first virtual characters in each character set are the same. For example, set partitioning is performed on the plurality of first virtual characters based on a proportion of the first virtual characters of each character type expected in each character set, and the attack distance type of each first virtual character in the character set is the same. It is assumed that each character set includes one first virtual character of the BOSS type, at least one first virtual character of the elite type, and at least two first virtual characters of the ordinary type, and the attack distance types of all the first virtual characters in the character set are remote attack or close attack. Set partitioning may be performed on the plurality of first virtual characters according to the foregoing specified conditions of the character type and the attack distance type that the first virtual characters in the character sets need to satisfy.

It may be understood that the set partitioning is not limited to the foregoing listed manners, and other set partitioning manners will not be specifically described here.

In a possible implementation, the plurality of virtual characters in the game scene may further include a third virtual character, which does not participate in attacking the second virtual character. In the process of performing set partitioning on the plurality of first virtual characters into a plurality of character sets, at least two first virtual characters and at least one third virtual character may alternatively be partitioned into one character set.

Character set 1 is used as an example. Character set 1 includes three virtual characters, namely, virtual character m1, virtual character m2, and virtual character m3, where virtual character m1 and virtual character m2 are the first virtual characters, and virtual character m3 is the third virtual character. The game scene further includes virtual character p1 and virtual character p2, where virtual character p1 is the second virtual character. In the target interaction cycle, for the three first virtual characters in character set 1, virtual character m1 and virtual character m2 may be used to attack virtual character p1 at least, and virtual character m3 may only be used to attack virtual character p2.

It should be noted that the third virtual character in the character set does not affect subsequent processes of determining a first target virtual character and controlling the first target virtual character to attack the second virtual character.

S120: Determine, for each of the plurality of character sets, a first target virtual character in the character set that satisfies a condition for initiating an interactive action in a target interaction cycle.

It should be noted that the process of determining the first target virtual character in each character set in the target interaction cycle is the same. In this step, one character set is used as an example to describe the process of determining the first target virtual character. It should be understood that each first virtual character in this step is the first virtual character in the same character set.

For convenient description and understanding of solutions, the embodiment of the present disclosure defines the first virtual character in the character set that satisfies the condition for initiating an interactive action as the first target virtual character. Here, when the first virtual character satisfies the interactive action condition, it indicates that the first virtual character can participate in attacking the second virtual character in the target interaction cycle.

In this step, whether the first virtual character in the character set satisfies the condition for initiating an interactive action may be determined in many manners.

Optionally, the attribute information of the first virtual character in the character set that needs to participate in attacking the second virtual character in each interaction cycle may be pre-determined. For the attribute information of the first virtual character in the character set that needs to participate in attacking the second virtual character in the target interaction cycle, the first target virtual character in the character set that satisfies the condition for initiating an interactive action is determined.

The character type is used as an example of the attribute information, and the following provisions may be made in advance: in a first interaction cycle, the first virtual character of the BOSS type in the character set is required to participate in attacking the second virtual character; in a second interaction cycle, the first virtual character of the ordinary type in the character set is required to participate in attacking the second virtual character; and in a third interaction cycle, the first virtual character of the elite type and the first virtual character of the ordinary type in the character set are required to participate in attacking the second virtual character. When the target interaction cycle is the first interaction cycle, the first virtual character of the BOSS type in the character set may be determined as the first target virtual character that satisfies the condition for initiating an interactive action.

When the target interaction cycle is the second interaction cycle, the first virtual character of the ordinary type in the character set may be determined as the first target virtual character that satisfies the condition for initiating an interactive action.

When the target interaction cycle is the third interaction cycle, the first virtual character of the elite type and the first virtual character of the ordinary type in the character set may be determined as the first target virtual characters that satisfy the condition for initiating an interactive action.

Optionally, before the first target virtual character is determined, a comprehensive weight that can take action may be configured for the first virtual character, and the first target virtual character in the character set that satisfies the condition for initiating an interactive action may be determined based on the comprehensive weight of the first virtual character.

In the embodiment of the present disclosure, for each of the plurality of character sets, the comprehensive weight that each first virtual character in the character set can take action in the target interaction cycle may be determined; and the first target virtual character in the character set that satisfies the condition for initiating an interactive action may be determined based on the comprehensive weight of each first virtual character.

Optionally, the first target virtual character may be determined based on the magnitude relationship between the comprehensive weights of the first virtual characters; or the first target virtual character may be determined based on the magnitude relationship between the comprehensive weight of each first virtual character and a preset value.

In a possible implementation of the present disclosure, the first virtual characters in the character set may be sorted in descending order of comprehensive weights; and a preset quantity of first top-ranking virtual characters in the character set may be determined as first target virtual characters that satisfy the condition for initiating an interactive action. For example, the preset quantity is 3, and 3 first top-ranking virtual characters in the character set may be determined as the first target virtual characters that satisfy the condition for initiating an interactive action.

The preset quantity may be determined according to an actual design requirement. Alternatively, an upper limit quantity of first virtual characters that can participate in attacking the second virtual character in an interaction cycle may be preset for each character set, and the preset quantity is not greater than the upper limit quantity. For example, the upper limit quantity is set to 4, and the preset quantity may be an integer within 4.

In a possible implementation of the present disclosure, the first virtual character in the character set, the comprehensive weight of which exceeds a preset weight threshold, may be determined; and the corresponding first virtual character, the comprehensive weight of which exceeds the preset weight threshold, may be determined as the first target virtual character that satisfies the condition for initiating an interactive action. The preset weight threshold may be determined according to an actual design requirement. For example, the preset weight threshold is 30. The first virtual character, the corresponding comprehensive weight of which exceeds 30, may be determined as the first target virtual character that satisfies the condition for initiating an interactive action.

It may be understood that the manner of determining the first target virtual character based on the comprehensive weight is not limited to the foregoing listed manners. Other manners of determining the first target virtual character based on the comprehensive weight will not be specifically described here.

The following describes a specific process of determining the comprehensive weight of each first virtual character in the character set in the target interaction cycle.

Before the first target virtual character is determined, the comprehensive weight that can take action may be configured for the first virtual character. Specifically, when the target interaction cycle is the first interaction cycle, an initial weight is configured for each first virtual character according to the attribute information of each first virtual character in the character set; and the initial weight of each first virtual character is used as the comprehensive weight of each first virtual character in the target interaction cycle.

The foregoing attribute information includes at least one of a character type, an attack frequency, an attack distance type, an attack effect, and a movement speed. To ensure that the first target virtual character is distinguished from the first virtual characters in the character set, the initial weights of at least two first virtual characters in the character set may differ. Therefore, the initial weights of the first virtual characters with different attribute information may be different. When the attribute information of each first virtual character in the character set is the same, a different initial weight may be randomly assigned to each first virtual character.

It may be understood that the initial weight may be configured for each first virtual character based on at least one of the character type, the attack frequency, the attack distance type, the attack effect, and the movement speed.

The character type is used as an example of the attribute information below to describe some manners of configuring the initial weight based on the character type, where the character type may include at least a BOSS type, an elite type, and an ordinary type.

Optionally, a highest initial weight may be configured for the first virtual character of the BOSS type, a lowest initial weight may be configured for the first virtual character of the ordinary type, and the initial weight configured for the first virtual character of the elite type is between the initial weight of the first virtual character of the BOSS type and the initial weight of the first virtual character of the ordinary type.

For example, the initial weight of the first virtual character of the BOSS type is 40, the initial weight of the first virtual character of the elite type is 20, and the initial weight of the first virtual character of the ordinary type is 10. First virtual character a is used as an example. The character type of the first virtual character a is the BOSS type, and the initial weight of the first virtual character a may be configured to 40.

The movement speed is used as an example of the attribute information below to describe some manners of configuring the initial weight based on the movement speed.

It may be understood that the first virtual character with a faster movement speed usually arrives at the vicinity of the second virtual character in a shorter time, thereby preferentially attacking the second virtual character. Therefore, for the first virtual character with a faster movement speed, a higher initial weight may be configured; and for the first virtual character with a slower movement speed, a lower initial weight may be configured.

Optionally, the movement speed may be partitioned into a plurality of speed interval levels, each speed interval level corresponding to a different initial weight. The initial weight of each first virtual character may be determined according to the speed interval level of the movement speed of each first virtual character. For example, a first speed interval level, a second speed interval level, and a third speed interval level may be set. A speed range corresponding to the first speed interval level is 1 m/s to 3 m/s, and the initial weight corresponding to the first speed interval level is 5; a speed range corresponding to the second speed interval level is 3 m/s to 6 m/s, and the initial weight corresponding to the second speed interval level is 10; and a speed range corresponding to the third speed interval level is greater than 6 m/s, and the initial weight corresponding to the third speed interval level is 15.

First virtual character a is used as an example, and the movement speed of first virtual character a is 4 m/s. Therefore, the movement speed of first virtual character a belongs to the second speed interval level, and the initial weight of first virtual character a may be configured to 10.

The character type and the movement speed are used as an example of the attribute information below to describe some manners of configuring the initial weight based on the character type and the movement speed.

Optionally, each character type corresponds to a different first weight; and the movement speed may be partitioned into a plurality of speed interval levels, each speed interval level corresponding to a different second weight. The initial weight of the first virtual character is determined based on the first weight corresponding to the character type of the first virtual character and the second weight corresponding to the speed interval level of the movement speed of the first virtual character. For example, a sum of the first weight and the second weight of the first virtual character may be used as the initial weight of the first virtual character, or an average value of the first weight and the second weight of the first virtual character may be used as the initial weight of the first virtual character.

For example, the first weight of the first virtual character of the BOSS type is set to 40, the first weight of the first virtual character of the elite type is set to 20, and the first weight of the first virtual character of the ordinary type is set to 10. A first speed interval level, a second speed interval level, and a third speed interval level may be set. A speed range corresponding to the first speed interval level is 1 m/s to 3 m/s, and the second weight corresponding to the first speed interval level is 5; a speed range corresponding to the second speed interval level is 3 m/s to 6 m/s, and the second weight corresponding to the second speed interval level is 10; and a speed range corresponding to the third speed interval level is greater than 6 m/s, and the second weight corresponding to the third speed interval level is 15.

First virtual character a is used as an example, the character type of first virtual character a is the BOSS type, and the movement speed of first virtual character a is 4 m/s. The first weight of first virtual character a is 40, and the second weight of first virtual character a is 10. A sum of the first weight and the second weight of first virtual character a is used as the initial weight of first virtual character a, and the initial weight of first virtual character a may be determined to 50.

It may be understood that the manner of configuring the initial weight is not limited to the foregoing listed manners. Other manners of configuring the initial weight will not be specifically described here.

In the embodiment of the present disclosure, in order to ensure that each first virtual character in the character set has a probability of being determined as the first target virtual character, the comprehensive weight of at least one first virtual character in the character set may be readjusted after the end of each interaction cycle, thereby ensuring to a large extent that each first virtual character has an opportunity to be determined as the target virtual character.

Optionally, the target interaction cycle may be used as a current interaction cycle to obtain a comprehensive weight of each first virtual character in the character set at the end of the previous interaction cycle of the current interaction cycle, and a weight gain of each first virtual character; a comprehensive weight of each first virtual character in the current interaction cycle is determined based on the comprehensive weight of each first virtual character and the weight gain of each first virtual character; and the comprehensive weight of each first virtual character in the current interaction cycle is determined as the comprehensive weight of each first virtual character in the target interaction cycle.

In the embodiment of the present disclosure, the weight gain may represent a weight increment. The comprehensive weight of the first virtual character at the end of the previous interaction cycle is added to the corresponding weight increment to obtain the comprehensive weight of the first virtual character in the current interaction cycle. The weight gain may represent a weight increase proportion. The comprehensive weight of the first virtual character at the end of the previous interaction cycle is amplified according to the corresponding weight growth proportion to obtain the comprehensive weight of the first virtual character in the current interaction cycle.

Optionally, in order to increase the probability that the first virtual character which does not satisfy the condition for initiating an interactive action in the previous interaction cycle can be determined as the first target virtual character in the target interaction cycle, the corresponding weight gain, in the target interaction cycle, of the first virtual character which does not satisfy the condition for initiating an interactive action in the previous interaction cycle may be set to be greater than the corresponding weight gain, in the target interaction cycle, of the first target virtual character in the previous interaction cycle.

For example, for the first target virtual character in the previous interaction cycle, the corresponding weight increment of the first virtual character in the target interaction cycle may be set to 0, or the corresponding weight increase proportion of the first virtual character in the target interaction cycle may be set to 1; and for the first virtual character that does not satisfy the condition for initiating an interactive action in the previous interaction cycle, the corresponding weight increment of the first virtual character in the target interaction cycle may be set to any value greater than 0, or the corresponding weight increase proportion of the first virtual character in the target interaction cycle may be set to any proportion value greater than 1.

Optionally, each first virtual character that does not satisfy the condition for initiating an interactive action in the previous interaction cycle may have the same corresponding weight gain in the target interaction cycle. Alternatively, each first virtual character that does not satisfy the condition for initiating an interactive action in the previous interaction cycle may have a different corresponding weight gain in the target interaction cycle, for example, the corresponding weight gain of the first virtual character in the target interaction cycle may be determined according to the attribute information of the first virtual character.

Optionally, each first target virtual character in the previous interaction cycle may have the same corresponding weight gain in the target interaction cycle. Alternatively, each first target virtual character in the previous interaction cycle may have a different corresponding weight gain in the target interaction cycle, for example, the corresponding weight gain of the first virtual character in the target interaction cycle may be determined according to the attribute information of the first virtual character.

Optionally, in order to increase the probability that the first virtual character which does not satisfy the condition for initiating an interactive action in the previous interaction cycle may be determined as the first target virtual character in the target interaction cycle, the comprehensive weight of each first virtual character in at least one first virtual character may be reset to a preset weight after the at least one first virtual character attacks the second virtual character. The preset weight of each first virtual character in the at least one first virtual character is used as the comprehensive weight of each first virtual character in the at least one first virtual character at the end of the target interaction cycle. The foregoing process may ensure to a large extent that each first virtual character has the opportunity to be determined as the target virtual character.

It may be understood that the corresponding preset weight of the first virtual character should be smaller than the current comprehensive weight of the first virtual character. Specifically, the preset weight includes an initial weight and a preset fixed weight. After the at least one first virtual character attacks the second virtual character, the comprehensive weight of each first virtual character in the at least one first virtual character is reset to the initial weight or the preset fixed weight, where the preset fixed weight may be any value less than the current comprehensive weight of the first virtual character, for example, the preset fixed weight may be zero.

S130: Control the determined first target virtual character to attack the second virtual character.

In the embodiment of the present disclosure, after the first target virtual character in any character set is determined, the first target virtual character in the character set may be controlled to attack the second virtual character; or after the first target virtual characters in a specified quantity of character sets are determined, the first target virtual characters in the specified quantity of character sets may be controlled to attack the second virtual character. The specified quantity may be a total quantity of character sets or any value less than the total quantity of character sets.

In the embodiment of the present disclosure, the first target virtual character attacks the second virtual character, which may refer to a behavior that the first virtual character directly attacks the second virtual character. The first target virtual character attacks the second virtual character, which may alternatively refer to a behavior that the first target virtual character assists other first virtual characters in attacking the second virtual character. For example, for a first target virtual character, the first target virtual character may restrict the action of the second virtual character, or the first target virtual character may provide weapons or energy for other first target virtual characters to attack the second virtual character, or the first target virtual character may block the counterattack of the second virtual character for other first target virtual characters, or the like. The foregoing behaviors of the first target virtual character may be considered as that the first target virtual character attacks the second virtual character.

Figure 2:
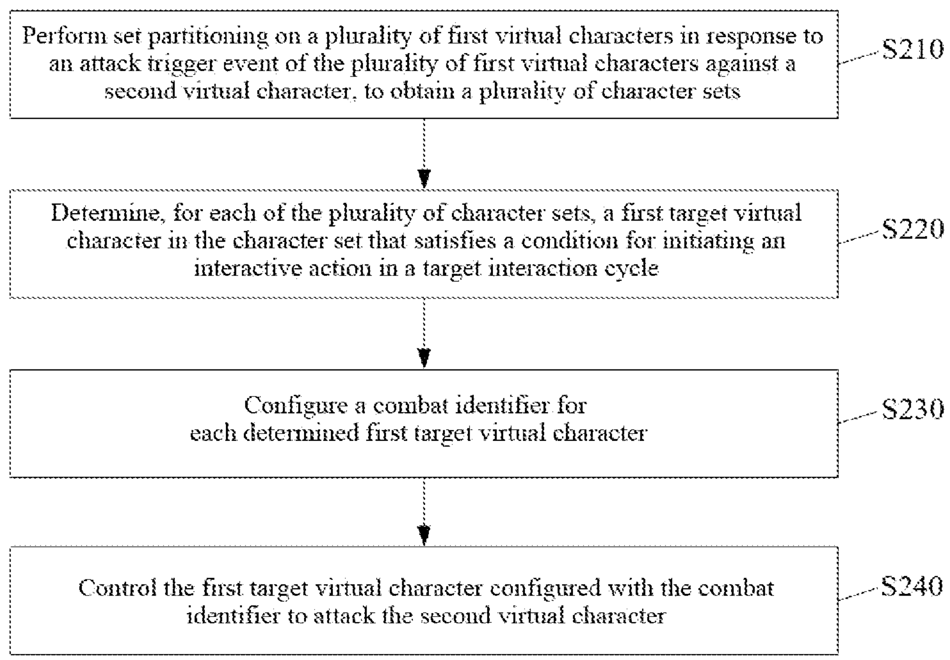
FIG. 2 is a flowchart of another character interaction control method provided in an embodiment of the present disclosure.

Refer to FIG. 2, which is a flowchart of another character interaction control method provided in an embodiment of the present disclosure. The method includes steps S210 to S240.

S210: Perform set partitioning on a plurality of first virtual characters in response to an attack trigger event of the plurality of first virtual characters against a second virtual character, to obtain a plurality of character sets.

This step may refer to the description of step S110 and may achieve the same technical effect, so details will not be repeated here.

S220: Determine, for each of the plurality of character sets, a first target virtual character in the character set that satisfies a condition for initiating an interactive action in a target interaction cycle.

This step may refer to the description of step S120 and may achieve the same technical effect, so details will not be repeated here.

S230: Configure a combat identifier for each determined first target virtual character.

The character set has at least one combat identifier, and a quantity of combat identifiers that the character set has may be determined according to an actual design requirement. Alternatively, an upper limit quantity of first virtual characters that can participate in attacking the second virtual character in an interaction cycle may be set for each character set, and the quantity of combat identifiers that the character set has is not greater than the upper limit quantity. For example, the upper limit quantity is set to 4, and the quantity of combat identifiers that the character set has may be an integer within 4.

In this step, after the first target virtual character in the character set that satisfies the condition for initiating an interactive action in the target interaction cycle is determined, the combat identifier is configured for each first target virtual character in the character set. In subsequent steps, the first target virtual character configured with the combat identifier can attack the second virtual character.

Optionally, the quantity of combat identifiers that each character set has may be determined according to at least one of a total quantity of combat identifiers, a total quantity of first virtual characters, a quantity of character sets, and a quantity of first virtual characters in each character set; or in a case that the total quantity of combat identifiers is unchanged, the quantity of combat identifiers that each character set has may be randomly determined; or the quantity of combat identifiers that each character set has may be set according to a current game difficulty; or the quantity of combat identifiers that each character set has may be set by a game player. It may be understood that the manner of determining the quantity of combat identifiers is not limited to the foregoing listed manners. Other manners of determining the quantity of combat identifiers will not be specifically described here.

Optionally, the quantity of combat identifiers that the character set has in each interaction cycle may be the same. Alternatively, a corresponding quantity of combat identifiers that the character set has in next interaction cycle may be re-determined after the end of one interaction cycle.

S240: Control the first target virtual character configured with the combat identifier to attack the second virtual character.

In the embodiment of the present disclosure, for the first target virtual character configured with the combat identifier, the combat identifier configured for the first target virtual character may be withdrawn in some cases. After the combat identifier of the first target virtual character is withdrawn, the first target virtual character will not attack the second virtual character in the target interaction cycle. Therefore, in this step, whether each first target virtual character is configured with a combat identifier may be periodically detected. When it is determined that the first target virtual character is configured with a combat identifier, the first target virtual character configured with the combat identifier may be controlled to attack the second virtual character.

The following describes a specific process of withdrawing the combat identifier configured for the first target virtual character.

In the embodiment of the present disclosure, when it is determined that any first target virtual character configured with a combat identifier satisfies a combat identifier withdrawal condition, the combat identifier of the first target virtual character that satisfies the combat identifier withdrawal condition is withdrawn.

Specifically, it may be determined in the following manner that the first target virtual character configured with the combat identifier satisfies the combat identifier withdrawal condition:

For each first target virtual character configured with a combat identifier, when the first target virtual character has died, it is determined that the dead first target virtual character satisfies the combat identifier withdrawal condition.

Optionally, when the first target virtual character dies due to the counterattack of the second virtual character or other factors, it may be determined that the first target virtual character satisfies the combat identifier withdrawal condition, thereby withdrawing the combat identifier of the first target virtual character.

For each first target virtual character configured with a combat identifier, when the first target virtual character is struck to fly or fall it is determined that the first target virtual character struck to fly or fall satisfies the combat identifier withdrawal condition.

Optionally, when the first target virtual character is struck to fly or fall due to the counterattack of the second virtual character, it may be determined that the first target virtual character satisfies the combat identifier withdrawal condition, thereby withdrawing the combat identifier of the first target virtual character.

For each first target virtual character configured with a combat identifier, it is determined at the end of an attack task of the first target virtual character that the first target virtual character who has completed the attack task satisfies the combat identifier withdrawal condition.

Optionally, it is determined that the attack task of the first target virtual character ends when attack duration of the first target virtual character against the second virtual character reaches a preset duration threshold, or when the number of attacks of the first target virtual character against the second virtual character reaches a preset number threshold, or when the target interaction cycle ends, and then it is determined that the first target virtual character satisfies the combat identifier withdrawal condition, thereby withdrawing the combat identifier of the first target virtual character.

Other content of this step may refer to the description of step S130 and may achieve the same technical effect, so details will not be repeated here.

Based on the same inventive concept, an embodiment of the present disclosure further provides a character interaction control apparatus corresponding to the character interaction control method. Because the principle of solving problems by the character interaction control apparatus in the embodiment of the present disclosure is similar to that by the foregoing character interaction control method in the embodiment of the present disclosure, the implementation of the apparatus may refer to the implementation of the method, and any repetition will not be repeated.

Figure 3:
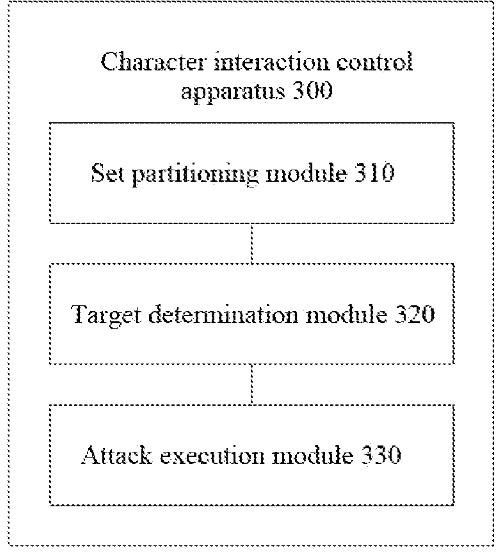
FIG. 3 is a first schematic diagram of a character interaction control apparatus provided in an embodiment of the present disclosure.

Refer to FIG. 3, which is a first schematic diagram of a character interaction control apparatus according to an embodiment of the present disclosure. The character interaction control apparatus 300 includes a set partitioning module 310, a target determination module 320, and an attack execution module 330.

The set partitioning module 310 is configured to perform set partitioning on a plurality of first virtual characters in response to an attack trigger event of the plurality of first virtual characters against a second virtual character, to obtain a plurality of character sets, where the character set includes at least two first virtual characters.

The target determination module 320 is configured to determine, for each of the plurality of character sets, a first target virtual character in the character set that satisfies a condition for initiating an interactive action in a target interaction cycle.

The attack execution module 330 is configured to control the determined first target virtual character to attack the second virtual character.

In a possible implementation, the set partitioning module 310 is, when configured to perform set partitioning on a plurality of first virtual characters to obtain a plurality of character sets, specifically configured to:

determine attribute information of each first virtual character among the plurality of first virtual characters; and perform set partitioning on the plurality of first virtual characters according to the attribute information of each first virtual character to obtain the plurality of character sets, where the attribute information includes at least one of a character type, an attack frequency, an attack distance type, an attack effect, and a movement speed.

In a possible implementation, the target determination module 320 is, when configured to determine, for each of the plurality of character sets, a first target virtual character in the character set that satisfies a condition for initiating an interactive action in a target interaction cycle, specifically configured to:

determine, for each of the plurality of character sets, a comprehensive weight that each first virtual character in the character set can take action in the target interaction cycle; and determine, according to the comprehensive weight of each first virtual character, the first target virtual character in the character set that satisfies the condition for initiating an interactive action in the target interaction cycle.

In a possible implementation, the target determination module 320 is, when configured to determine a comprehensive weight that each first virtual character in the character set can take action in the target interaction cycle, specifically configured to:

use the target interaction cycle as a current interaction cycle, and obtain a comprehensive weight of each first virtual character in the character set at the end of the previous interaction cycle of the current interaction cycle, and a weight gain of each first virtual character;

determine a comprehensive weight of each first virtual character in the current interaction cycle based on the comprehensive weight of each first virtual character and the weight gain of each first virtual character; and determine the comprehensive weight of each first virtual character in the current interaction cycle as the comprehensive weight of each first virtual character in the target interaction cycle.

In a possible implementation, the target determination module 320 is, when configured to determine a comprehensive weight that each first virtual character in the character set can take action in the target interaction cycle, specifically configured to:

when the target interaction cycle is a first interaction cycle, configure an initial weight for each first virtual character according to the attribute information of each first virtual character in the character set; and use the initial weight of each first virtual character as the comprehensive weight of each first virtual character in the target interaction cycle, where the attribute information includes at least one of a character type, an attack frequency, an attack distance type, an attack effect, and a movement speed.

In a possible implementation, the target determination module is further configured to:

after at least one first virtual character attacks the second virtual character, reset the comprehensive weight of each first virtual character in the at least one first virtual character to a preset weight, where the preset weight includes an initial weight and a preset fixed weight; and use the preset weight of each first virtual character in the at least one first virtual character as the comprehensive weight of each first virtual character in the at least one first virtual character at the end of the target interaction cycle.

In a possible implementation, the target determination module 320 is, when configured to determine, according to the comprehensive weight of each first virtual character, the first target virtual character in the character set that satisfies the condition for initiating an interactive action in the target interaction cycle, specifically configured to:

sort the first virtual characters in the character set in descending order of comprehensive weights; and determine a preset quantity of first top-ranking virtual characters in the character set as first target virtual characters that satisfy the condition for initiating an interactive action.

In a possible implementation, the target determination module 320 is, when configured to determine, according to the comprehensive weight of each first virtual character, the first target virtual character in the character set that satisfies the condition for initiating an interactive action in the target interaction cycle, specifically configured to:

determine the first virtual character in the character set, the comprehensive weight of which exceeds a preset weight threshold; and determine the corresponding first virtual character, the comprehensive weight of which exceeds the preset weight threshold, as the first target virtual character that satisfies the condition for initiating an interactive action.

In a possible implementation, the attack execution module 330 is, when configured to control the determined first target virtual character to attack the second virtual character, specifically configured to:

configure a combat identifier for each determined first target virtual character; and control the first target virtual character configured with the combat identifier to attack the second virtual character.

Figure 4:
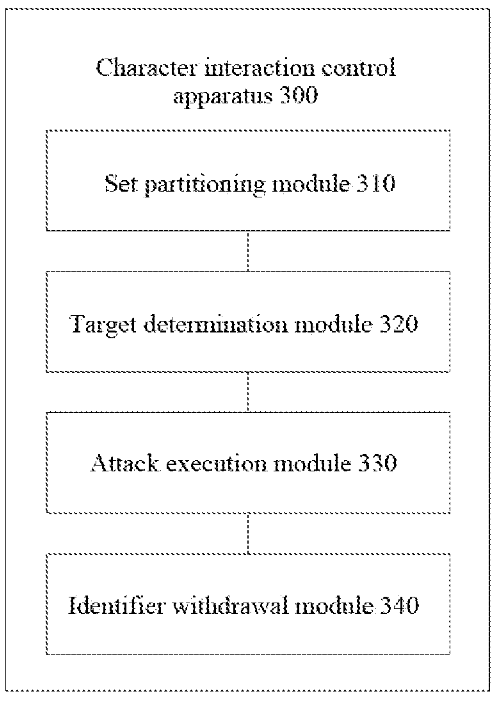
FIG. 4 is a second schematic diagram of a character interaction control apparatus provided in an embodiment of the present disclosure.

In a possible implementation, refer to FIG. 4, which is a second schematic diagram of a character interaction control apparatus provided in an embodiment of the present disclosure. The character interaction control apparatus 300 includes a set partitioning module 310, a target determination module 320, an attack execution module 330, and an identifier withdrawal module 340.

The identifier withdrawal module 340 is configured to, when it is determined that any first target virtual character configured with a combat identifier satisfies a combat identifier withdrawal condition, withdraw the combat identifier of the first target virtual character that satisfies the combat identifier withdrawal condition.

In a possible implementation, the identifier withdrawal module 340 determines in the following manner that the first target virtual character configured with the combat identifier satisfies the combat identifier withdrawal condition:

for each first target virtual character configured with a combat identifier, when the first target virtual character has died, determine that the dead first target virtual character satisfies the combat identifier withdrawal condition;

for each first target virtual character configured with a combat identifier, when the first target virtual character is struck to fly or fall, determine that the first target virtual character struck to fly or fall satisfies the combat identifier withdrawal condition; or for each first target virtual character configured with a combat identifier, determine at the end of an attack task of the first target virtual character that the first target virtual character who has completed the attack task satisfies the combat identifier withdrawal condition.

Descriptions of a processing flow of each module in the apparatus and an interaction flow between modules may refer to relevant descriptions in the foregoing method embodiments, and details are not repeated here.

Figure 5:
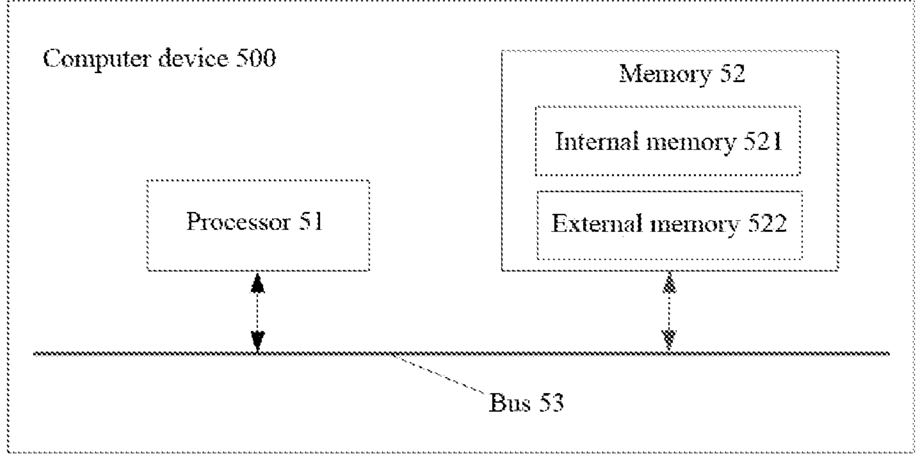
FIG. 5 is a schematic structural diagram of a computer device provided in an embodiment of the present disclosure.

Corresponding to the character interaction control method in FIG. 1, an embodiment of the present disclosure further provides a computer device 500, as shown in FIG. 5, which is a schematic structural diagram of a computer device provided in an embodiment of the present disclosure. The computer device 500 includes a processor 51, a memory 52, and a bus 53. The memory 52 is configured to store execution instructions, and includes an internal memory 521 and an external memory 522. Here, the internal memory 521 is configured to temporarily store operational data in the processor 51 and data exchanged with the external memory 522 such as a hard disk. The processor 51 exchanges data with the external memory 522 through the internal memory 521. When the computer device 500 runs, the processor 51 communicates with the memory 52 through the bus 53, and the processor 51 is enabled to execute the following instructions:

performing set partitioning on a plurality of first virtual characters in response to an attack trigger event of the plurality of first virtual characters against a second virtual character, to obtain a plurality of character sets, where the character set includes at least two first virtual characters; determining, for each of the plurality of character sets, a first target virtual character in the character set that satisfies a condition for initiating an interactive action in a target interaction cycle; and controlling the determined first target virtual character to attack the second virtual character.

An embodiment of the present disclosure further provides a computer-readable storage medium, the computer-readable storage medium storing a computer program, and the steps of the character interaction control method in the foregoing method embodiment being executed when the computer program is run by a processor. The storage medium may be a volatile or non-volatile computer-readable storage medium.

An embodiment of the present disclosure further provides a computer program product, the computer program product carrying program code, the program code including instructions that may be used to execute the steps of the character interaction control method in the foregoing method embodiment. Details may refer to the foregoing method embodiment and will not be repeated here.

wherein said computer program product may be embodied specifically by means of hardware, software, or a combination thereof. In one optional embodiment, said computer program product is specifically embodied as a computer storage medium, and in another optional embodiment, the computer program product is specifically embodied as a software product, such as a Software Development Kit (SDK), etc.

It will be clear to those skilled in the art that, for the convenience and brevity of the description, the specific working processes of the systems and devices described above may be referred to the corresponding processes in the foregoing method embodiments and will not be repeated herein. In the several embodiments provided in this disclosure, it should be understood that the disclosed systems, devices and methods, can be implemented in other ways. The embodiments of the devices described above are merely schematic, for example, the division of the units described, which is only a logical functional division, can be divided in another way when actually implemented, and also, for example, multiple units or components can be combined or can be integrated into another system, or some features can be ignored, or not implemented. On another point, the mutual coupling or direct coupling or communication connection shown or discussed can be indirect coupling or communication connection through some communication interface, device or unit, which can be electrical, mechanical or other forms.

Said units illustrated as separate components may or may not be physically separated, and the components displayed as units may or may not be physical units, i.e., they may be located in one place or may be distributed to a plurality of network units. Some or all of these units may be selected according to practical needs to achieve the purpose of the present embodiment solution.

In addition, each functional unit in each embodiment of the present disclosure may be integrated in a single processing unit, or each unit may be physically present separately, or two or more units may be integrated in a single unit.

Said functionality, when implemented in the form of a software functional unit and sold or used as a separate product, may be stored in a processor-executable, non-volatile computer readable storage medium. It is understood that the technical solution of the present disclosure, or that part of the technical solution that essentially contributes to the prior art, may be embodied in the form of a software product stored in a storage medium comprising a number of instructions to cause a computer device (which may be a personal computer, a server, or a network device, etc.) to perform all or some of the steps of the method described in various embodiments of the present disclosure. All or some of the steps of the method described in various embodiments of the present disclosure. The aforementioned storage media include: USB flash drives, removable hard drives, Read-Only Memory (ROM), Random Access Memory (RAM), disks, or CD-ROMs, and other media that can store program code.

Finally, it should be noted that the above described embodiments are only specific embodiments of the present disclosure to illustrate the technical solution of the present disclosure, not to limit it, and the scope of protection of the present disclosure is not limited thereto, although the present disclosure is described in detail with reference to the foregoing embodiments, it should be understood by a person of ordinary skill in the art that any person of skill in the art, within the technical scope disclosed by the present disclosure, may still modify or readily conceive of changes to the technical solutions described in the preceding embodiments, or make equivalent substitutions to some of the technical features thereof; and these modifications, changes or substitutions do not cause the essence of the corresponding technical solutions to depart from the spirit and scope of the technical solutions of the embodiments of the present disclosure, and shall be covered within the scope of protection of the present disclosure. Therefore, the scope of protection of the present disclosure shall be stated to be subject to the scope of protection of the claims.

What is claimed is:

1. A method for improving control of virtual characters in a gaming application, wherein the method comprises:

performing set partitioning on a plurality of first virtual characters to obtain a plurality of character sets in response to an attack trigger event of the plurality of first virtual characters against a second virtual character, wherein the plurality of first virtual characters are controlled by a server associated with the gaming application, and wherein each of the plurality of character sets comprises at least two server-controlled virtual characters;

selecting, from each of the plurality of character sets, a single server-controlled virtual character in the character set that satisfies a condition for initiating an interactive action in an interaction cycle; and controlling, by the server, the single server-controlled virtual character selected from each of the plurality of character sets to cause only the single server-controlled virtual character selected from each of the plurality of character sets to attack the second virtual character during the interaction cycle.

2. The method according to claim 1, wherein the performing set partitioning on a plurality of first virtual characters to obtain a plurality of character sets comprises:

determining attribute information of each first virtual character among the plurality of first virtual characters; and performing set partitioning on the plurality of first virtual characters according to the attribute information of each first virtual character to obtain the plurality of character sets, wherein the attribute information comprises at least one of a character type, an attack frequency, an attack distance type, an attack effect, and a movement speed.

3. The method according to claim 1, wherein the determining, for each of the plurality of character sets, a single server-controlled virtual character in the character set that satisfies a condition for initiating an interactive action in an interaction cycle comprises:

determining, for each of the plurality of character sets, a comprehensive weight that each first virtual character in the character set can take action in the interaction cycle; and determining, according to the comprehensive weight of each first virtual character, the first virtual character in the character set that satisfies the condition for initiating an interactive action in the interaction cycle.

4. The method according to claim 3, wherein the determining a comprehensive weight that each first virtual character in the character set can take action in the interaction cycle comprises:

using the interaction cycle as a current interaction cycle, and obtaining a comprehensive weight of each first virtual character in the character set at the end of the previous interaction cycle of the current interaction cycle, and a weight gain of each first virtual character;

determining a comprehensive weight of each first virtual character in the current interaction cycle based on the comprehensive weight of each first virtual character and the weight gain of each first virtual character; and determining the comprehensive weight of each first virtual character in the current interaction cycle as the comprehensive weight of each first virtual character in the interaction cycle.

5. The method according to claim 3, wherein the determining a comprehensive weight that each first virtual character in the character set can take action in the interaction cycle comprises:

when the interaction cycle is a first interaction cycle, configuring an initial weight for each first virtual character according to the attribute information of each first virtual character in the character set; and using the initial weight of each first virtual character as the comprehensive weight of each first virtual character in the interaction cycle, wherein the attribute information comprises at least one of a character type, an attack frequency, an attack distance type, an attack effect, and a movement speed.

6. The method according to claim 3, wherein after selecting, from each of the plurality of character sets, the single server-controlled virtual character in the character set that satisfies the condition for initiating an interactive action in the interaction cycle, the method further comprises:

after at least one first virtual character attacks the second virtual character, resetting the comprehensive weight of each first virtual character in the at least one first virtual character to a preset weight, wherein the preset weight comprises an initial weight and a preset fixed weight; and using the preset weight of each first virtual character in the at least one first virtual character as the comprehensive weight of each first virtual character in the at least one first virtual character at the end of the target interaction cycle.

7. The method according to claim 3, wherein the determining, according to the comprehensive weight of each first virtual character, the single server-controlled virtual character in the character set that satisfies the condition for initiating an interactive action in the interaction cycle comprises:

sorting the first virtual characters in the character set in descending order of comprehensive weights; and determining a preset quantity of first top-ranking virtual characters in the character set as single server-controlled virtual characters that satisfy the condition for initiating an interactive action.

8. The method according to claim 3, wherein the determining, according to the comprehensive weight of each first virtual character, the single server-controlled virtual character in the character set that satisfies the condition for initiating an interactive action in the interaction cycle comprises:

determining the first virtual character in the character set, the comprehensive weight of which exceeds a preset weight threshold; and determining the corresponding first virtual character, the comprehensive weight of which exceeds the preset weight threshold, as the single server-controlled virtual character that satisfies the condition for initiating an interactive action.

9. The method according to claim 1, wherein the controlling the determined single server-controlled virtual character cause the single server-controlled virtual character to attack the second virtual character comprises:

configuring a combat identifier for each selected single server-controlled virtual character; and controlling the selected single server-controlled virtual character configured with the participation identifier to attack the second virtual character.

10. The method according to claim 9, wherein after controlling the determined single server-controlled virtual character cause the single server-controlled virtual character to attack the second virtual character, the method further comprises:

when it is determined that any single server-controlled virtual character configured with a combat identifier satisfies a combat identifier withdrawal condition, withdrawing the combat identifier of the single server-controlled virtual character that satisfies the combat identifier withdrawal condition.

11. The method according to claim 10, wherein the single server-controlled virtual character configured with the combat identifier satisfies the combat identifier withdrawal condition is determined in the following manner:

for each single server-controlled virtual character configured with a combat identifier, when the single server-controlled virtual character has died, determining that the dead single server-controlled virtual character satisfies the combat identifier withdrawal condition;

for each single server-controlled virtual character configured with a combat identifier, when the single server-controlled virtual character is struck to fly or fall, determining that the single server-controlled virtual character struck to fly or fall satisfies the combat identifier withdrawal condition; or for each single server-controlled virtual character configured with a combat identifier, determining at the end of an attack task of the single server-controlled virtual character that the single server-controlled virtual character who has completed the attack task satisfies the combat identifier withdrawal condition.

12. A computer device, comprising a processor, a memory, and a bus, the memory storing machine-readable instructions executable by the processor, the processor communicating with the memory through the bus when the computer device runs, wherein the machine-readable instructions upon execution by the processor cause the processor to perform operations comprising:

performing set partitioning on a plurality of first virtual characters to obtain a plurality of character sets in response to an attack trigger event of the plurality of first virtual characters against a second virtual character, wherein the plurality of first virtual characters are controlled by a server associated with the gaming application, and wherein each of the plurality of character sets comprises at least two server-controlled virtual characters;

selecting, from each of the plurality of character sets, a single server-controlled virtual character in the character set that satisfies a condition for initiating an interactive action in an interaction cycle; and controlling, by the server, the single server-controlled virtual character selected from each of the plurality of character sets to cause only the single server-controlled virtual character selected from each of the plurality of character sets to attack the second virtual character during the interaction cycle.

13. The computer device according to claim 12, wherein the performing set partitioning on a plurality of first virtual characters to obtain a plurality of character sets comprises:

determining attribute information of each first virtual character among the plurality of first virtual characters; and performing set partitioning on the plurality of first virtual characters according to the attribute information of each first virtual character to obtain the plurality of character sets, wherein the attribute information comprises at least one of a character type, an attack frequency, an attack distance type, an attack effect, and a movement speed.

14. The computer device according to claim 12, wherein the determining, for each of the plurality of character sets, a single server-controlled virtual character in the character set that satisfies a condition for initiating an interactive action in an interaction cycle comprises:

determining, for each of the plurality of character sets, a comprehensive weight that each first virtual character in the character set can take action in the interaction cycle; and determining, according to the comprehensive weight of each first virtual character, the first virtual character in the character set that satisfies the condition for initiating an interactive action in the interaction cycle.

15. The computer device according to claim 14, wherein the determining a comprehensive weight that each first virtual character in the character set can take action in the interaction cycle comprises:

using the interaction cycle as a current interaction cycle, and obtaining a comprehensive weight of each first virtual character in the character set at the end of the previous interaction cycle of the current interaction cycle, and a weight gain of each first virtual character;

determining a comprehensive weight of each first virtual character in the current interaction cycle based on the comprehensive weight of each first virtual character and the weight gain of each first virtual character; and determining the comprehensive weight of each first virtual character in the current interaction cycle as the comprehensive weight of each first virtual character in the interaction cycle.

16. The computer device according to claim 14, wherein the determining a comprehensive weight that each first virtual character in the character set can take action in the interaction cycle comprises:

when the interaction cycle is a first interaction cycle, configuring an initial weight for each first virtual character according to the attribute information of each first virtual character in the character set; and using the initial weight of each first virtual character as the comprehensive weight of each first virtual character in the interaction cycle, wherein the attribute information comprises at least one of a character type, an attack frequency, an attack distance type, an attack effect, and a movement speed.

17. The computer device according to claim 14, wherein after selecting, from each of the plurality of character sets, the single server-controlled virtual character in the character set that satisfies the condition for initiating an interactive action in the interaction cycle, the method further comprises:

after at least one first virtual character attacks the second virtual character, resetting the comprehensive weight of each first virtual character in the at least one first virtual character to a preset weight, wherein the preset weight comprises an initial weight and a preset fixed weight; and using the preset weight of each first virtual character in the at least one first virtual character as the comprehensive weight of each first virtual character in the at least one first virtual character at the end of the interaction cycle.

18. The computer device according to claim 14, wherein the determining, according to the comprehensive weight of each first virtual character, the single server-controlled virtual character in the character set that satisfies the condition for initiating an interactive action in the interaction cycle comprises:

sorting the first virtual characters in the character set in descending order of comprehensive weights; and determining a preset quantity of first top-ranking virtual characters in the character set as single server-controlled virtual characters that satisfy the condition for initiating an interactive action.

19. A non-transitory computer-readable storage medium, wherein the computer-readable storage medium stores a computer program, wherein the computer program upon execution by a processor causes the processor to perform operations comprising:

performing set partitioning on a plurality of first virtual characters to obtain a plurality of character sets in response to an attack trigger event of the plurality of first virtual characters against a second virtual character, wherein the plurality of first virtual characters are controlled by a server associated with the gaming application, and wherein each of the plurality of character sets comprises at least two server-controlled virtual characters;

selecting, from each of the plurality of character sets, a single server-controlled virtual character in the character set that satisfies a condition for initiating an interactive action in an interaction cycle; and controlling, by the server, the single server-controlled virtual character selected from each of the plurality of character sets to cause only the single server-controlled virtual character selected from each of the plurality of character sets to attack the second virtual character during the interaction cycle.

* * * * *